Figure 14:
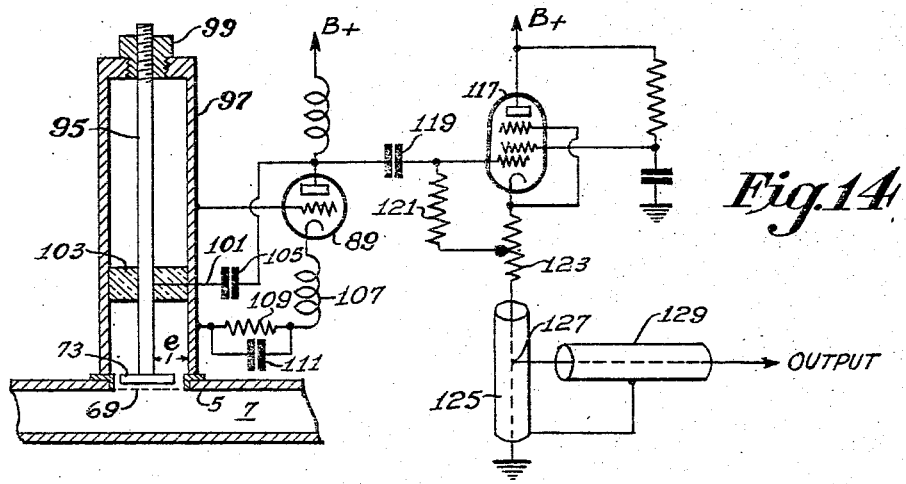

June 1, 1948.  L. E. NORTON  2,442,614
ELECTROSTATIC MICROWAVE MEASURING SYSTEM
Original Filed June 11, 1945  3 Sheets-Sheet 1
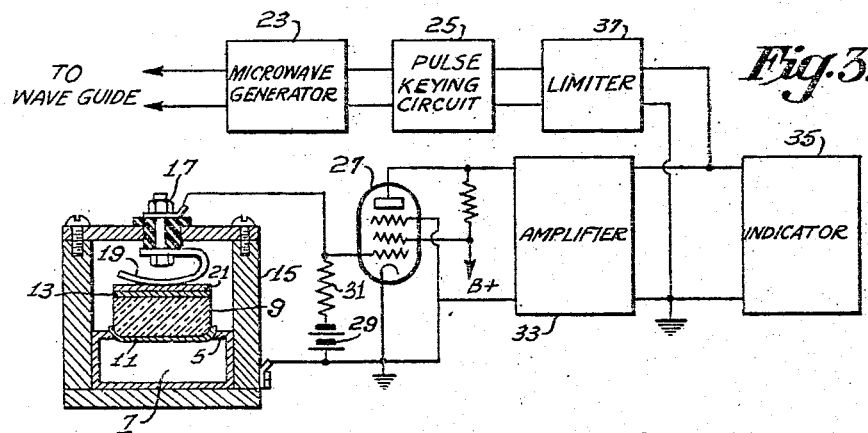
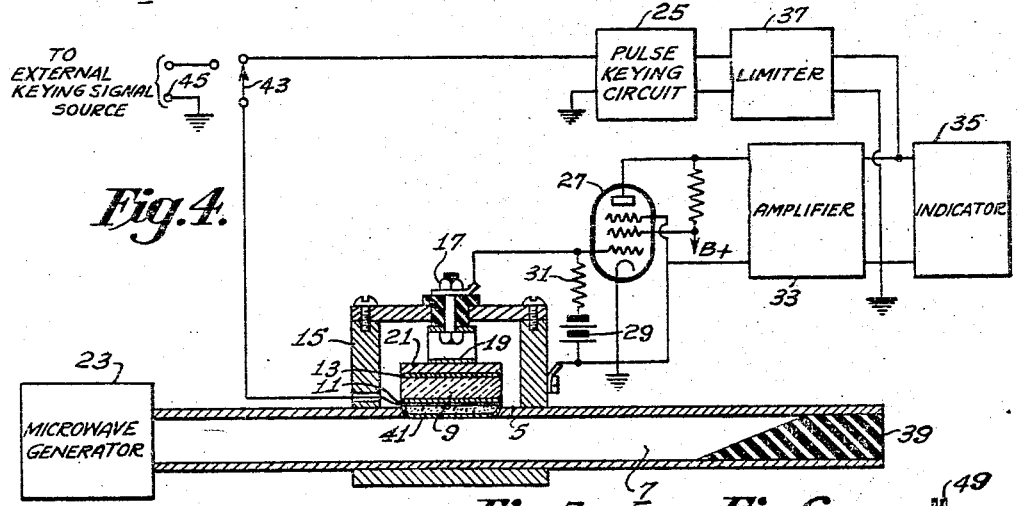
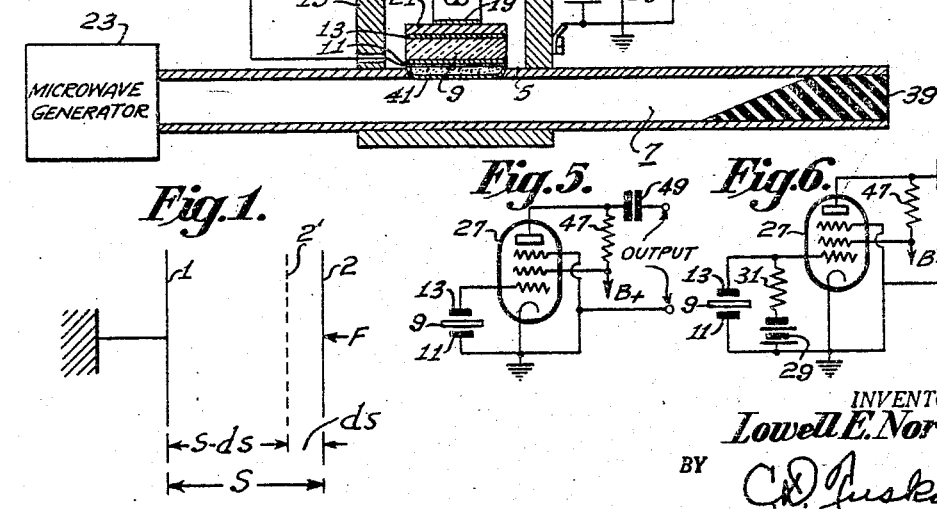
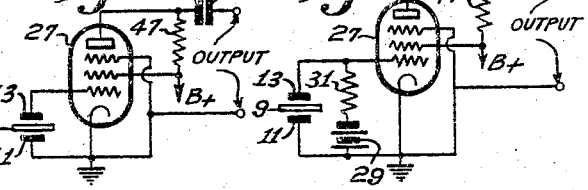
INVENTOR.
Lowell E. Norton
BY
ATTORNEY June 1, 1948.　　　　　L. E. NORTON　　　　　2,442,614
ELECTROSTATIC MICROWAVE MEASURING SYSTEM
Original Filed June 11, 1945　　　　　3 Sheets-Sheet 2
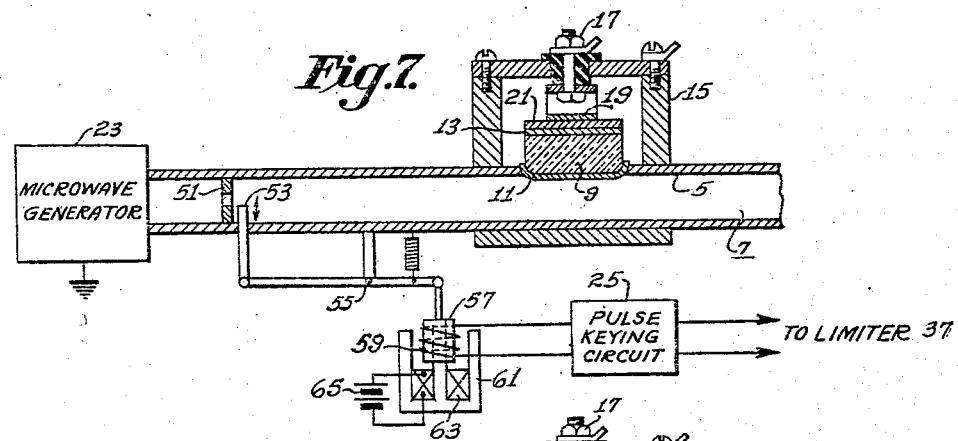
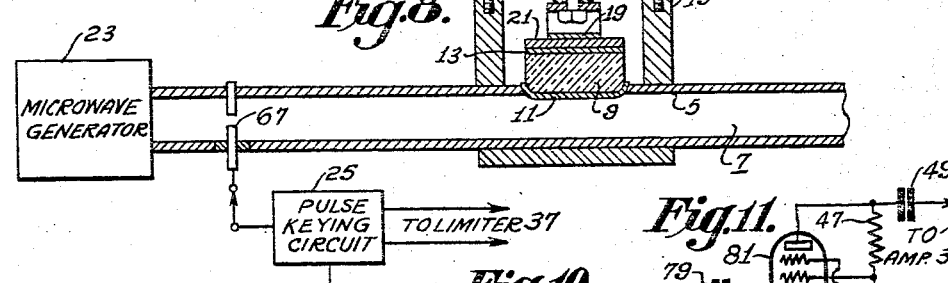
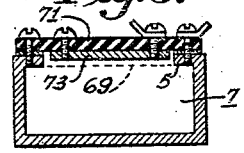
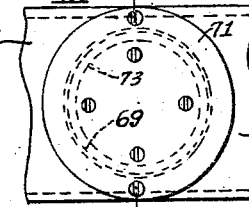
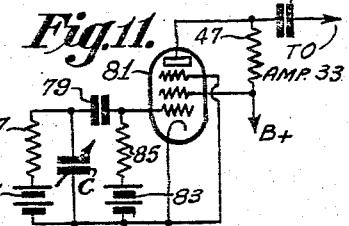
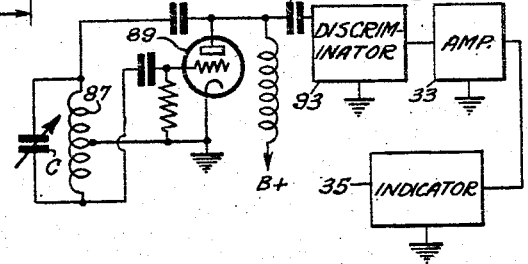
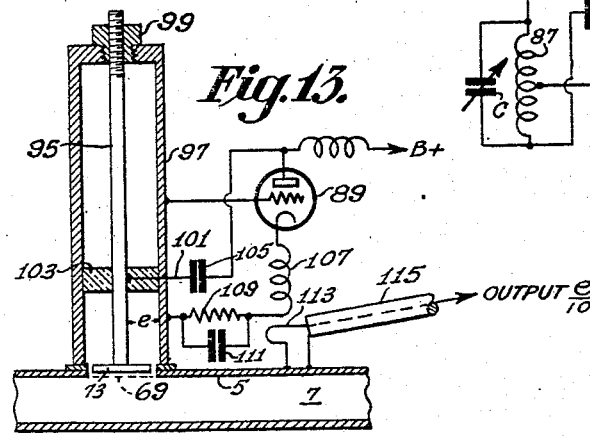
INVENTOR.
Lowell E. Norton
BY
ATTORNEY June 1, 1948. L. E. NORTON 2,442,614
ELECTROSTATIC MICROWAVE MEASURING SYSTEM
Original Filed June 11, 1945 3 Sheets—Sheet 3

INVENTOR.
Lowell E. Norton
BY
ATTORNEY

Patented June 1, 1948

2,442,614

UNITED STATES PATENT OFFICE 2,442,614

ELECTROSTATIC MICROWAVE MEASURING SYSTEM

Lowell E. Norton, Princeton Junction, N. J., assignor to Radio Corporation of America, a corporation of Delaware Original application June 11, 1945, Serial No. 598,739. Divided and this application April 30, 1946, Serial No. 665,958

5 Claims. (Cl. 171—95)

This application is a division of applicant's co-pending application Serial No. 598,739, filed June 11, 1945, entitled Microwave measuring apparatus, and assigned to the same assignee as the instant application.

This invention relates generally to improved methods of and means for measuring microwave transmission and more particularly to systems and methods for measuring microwave transmission through waveguides or coaxial transmission lines by employing the displacement of a portion of the outer wall of the transmission system due to stresses induced therein by the electric fields within the system.

Typical systems and methods will be described hereinafter by reference to their application to waveguide transmission systems. However, the same principles may be applied to coaxial transmission systems. If a portion of one of the wide faces of a waveguide is removed, and a flexible conductive diaphragm is substituted therefor, the stresses induced in the diaphragm in response to the electric fields due to microwave propagation through the waveguide will provide mechanical displacement of the diaphragm as a function of the strength of the electric fields. An increase in the electric field strength will tend to displace the diaphragm closer to the opposite waveguide wall while a lesser field strength will exert correspondingly less force upon the flexible diaphragm. If the diaphragm is highly resilient, and a good electrical conductor, its inherently high Q will provide measurable mechanical displacement with negligible absorption of microwave energy. The effect upon the diaphragm of the corresponding magnetic fields within the waveguide will tend to reduce said displacement to a slight extent, but the resultant of the displacements due to the electric and the magnetic fields may be usefully employed for measurements of the microwave energy propagated through the guide.

The mechanical displacement of the flexible conductive diaphragm may be employed to generate electric potentials as a function of the pressure applied by the diaphragm to a piezo crystal, or alternately, the diaphragm may comprise one electrode of a variable capacitor whereon the capacitance or the potential upon the charged capacitor may be employed to actuate an indicator or a control circuit.

Among the objects of the invention are to provide improved methods of and means for measuring microwave energy. Another object of the invention is to provide improved methods of and means for measuring microwave power propagated through a waveguide system. A further object of the invention is to provide improved methods of and means for measuring microwave energy propagated through a coaxial transmission system. An additional object of the invention is to provide improved methods of and means for measuring microwave propagation through a wave transmission system by employing the mechanical displacement of a flexible conductive element forming a portion of said system and responsive to the microwave fields therein. Another object is to provide improved methods of and means for measuring microwave energy propagated through a waveguide wherein the mechanical displacement of a portion of the waveguide wall provides mechanical deformation of a piezo crystal for generating electric potentials characteristic of the microwave transmission.

An additional object is to provide improved methods of and means for measuring microwave transmission through a waveguide wherein a flexible conductive element forming a portion of the waveguide walls comprises one electrode of a variable capacitor, and wherein the effective capacitance, or the charge upon said capacitor, is a measure of the microwave energy propagated through said guide. A still further object of the invention is to provide an improved method of and means for detecting microwave energy propagated through a waveguide including means for modulating said microwave energy as a function of the energy detected by a mechanical element responsive to the microwave field. An additional object is to provide improved methods of and means for measuring microwave transmission through a waveguide or coaxial transmission system including a novel indicator coupling circuit for minimizing noise signal components of the measured microwave energy.

Figure 15:
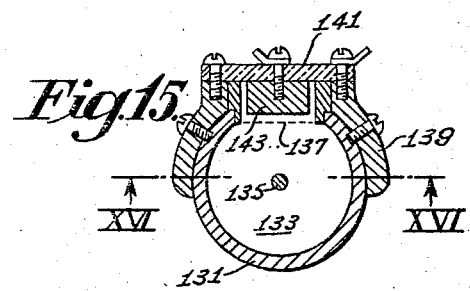
Figure 16:
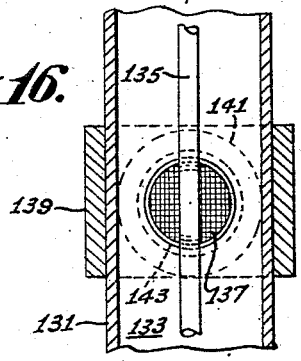

The invention will be described in greater detail by reference to the accompanying drawings of which Figure 1 is a schematic diagram illustrating the mechanical displacement of a flexible conductive element subjected to varying electric fields, Figure 2 is a perspective view of a typical waveguide including a flexible conductive diaphragm inserted in one of the wide faces thereof, Figure 3 is a transversely cross-sectional, partially schematic diagram of a first embodiment of the invention, Figure 4 is a longitudinally cross-sectional view of a first modification of said first embodiment of the invention, Figures 5 and 6 are schematic circuit diagrams of typical coupling circuits which may be employed with any of the embodiments of the invention described herein, Figure 7 is a longitudinally cross-sectional, partially schematic view of a second modification of said first embodiment of the invention, Figure 8 is a longitudinally cross-sectional, partially schematic view of a third modification of said first embodiment of the invention, Figure 9 is a transversely cross-sectional view taken along the section line IX—IX of a second embodiment of the invention, Figure 10 is a plan view of said second embodiment of the invention, Figures 11 and 12 are schematic diagrams of circuits employing said second embodiment of the invention, Figures 13 and 14 are longitudinally cross-sectional, partially schematic diagrams of a third embodiment of the invention, Figure 15 is a transversely cross-sectional elevational view of a fourth embodiment of the invention adapted to coaxial transmission line systems, and Figure 16 is a bottom view taken along the line XVI—XVI of said fourth embodiment of the invention. Similar reference characters are applied to similar elements throughout the drawings.

Referring to Figure 1, one of the wide faces 1 of a waveguide is normally spaced a distance $s$ from the opposite wide face 2 thereof which includes a flexible conductive diaphragm of the type described herein. If modulated microwaves are propagated between the waveguide conductors 1 and 2, the forces acting on the flexible diaphragm forming a portion of the waveguide conductor 2 will be proportional to the resultant of the stresses induced therein by the microwave electric and magnetic fields. At microwave frequencies the electrodes 1 and 2 will have both intensity and phase distribution with position and time, but since the two electrodes are charged surfaces having opposite polarity for corresponding incremental areas, the forces between said incremental areas are always attracting and are additive throughout the total areas of the flexible diaphragm as well as throughout other corresponding areas of the opposite wave guide faces. In electrostatic c. g. s. units the energy stored in an air dielectric is $$W = \tfrac{1}{2}CV^2 \text{ ergs} \qquad (1)$$

wherein $C$ is the capacitance and $V$ is the voltage between the conductors of the capacitor.

If the electrode 2 is displaced a distance $dS$ and is maintained in equilibrium by a holding force $F$ the resultant stored energy is $$W_1 = \tfrac{1}{2} \frac{S}{S+dS} C \left( \frac{S+dS}{S} V \right)^2 \text{ ergs} \qquad (2)$$

The increase in energy is $dW$ which is equal to $W_1 - W$, and must equal $F dS$ so that $$F dS = W_1 - W =$$

$$\tfrac{1}{2}\frac{S}{S+dS} C \left(\frac{S+dS}{S}V\right)^2 - \tfrac{1}{2}CV^2 = \tfrac{1}{2}\frac{dS}{S}CV^2 \text{ ergs} \qquad (3)$$

or $$F = \frac{CV^2}{2S} \text{ dynes} \qquad (4)$$

Since one statvolt=300 volts and one statfarad=$1/9 \times 10^{-11}$ farads, if $C$ and $V$ are expressed in farads and volts, respectively, then $$F = \frac{CV^2}{2S} \times 10^7 \text{ dynes} \qquad (5)$$

A typical application of the invention to a rectangular waveguide system, illustrated in Figure 2, includes a flexible conductive diaphragm 3 set into the upper waveguide face 5 of a typical waveguide system 7. For the sake of illustration, the conductive diaphragm 3 extends the full width of the waveguide face, and also extends a distance $b$ along said waveguide face in the direction of wave propagation. For purposes of computation, it may be assumed that the guided microwave propagation along the waveguide is in the X and −X directions and that the electric vector is in the ZY plane. For most types of operation it is desirable that the conductive diaphragm 3 have high mechanical Q and relatively high deflection sensitivity at the microwave modulation or interruption rate. The microwave modulation or interruption may be accomplished by modulating the microwave source directly, or by interrupting the microwave transmission by means of a suitable shutter or other device disposed between the microwave source and the flexible diaphragm.

Employing the XYZ coordinate system of Figure 2, the electric intensity is represented by $E = E_0 f(X, Y, Z, t)$, where $t$ is the time in seconds.

In conventional guided microwave propagation utilizing high conductivity waveguide wall conductors parallel to the XY plane, and disregarding the dependence of the voltage $E$ upon the Y axis, $$E = E_0 \sin(\omega t + kx) \qquad (6)$$

The electric force acting on the parallel upper and lower waveguide walls on a unit area of said walls is $$F = KE^2 \qquad (7)$$

so that $$\Delta F = K E_0^2 \Delta A \sin^2(\omega t + kx) \qquad (8)$$

where $\Delta F$ is the force acting on an incremental wall area $\Delta A$ (which is small with respect to the wavelength scale). For a waveguide wall of unity width along the Y axis and extending from $X = a$ to $X = (a+b)$ along the X axis, the electric force acting on the opposite waveguide walls per unit width and per unit length for any length $b$ per cycle of the propagated radiation is $$F_1 = K \int_0^{\frac{2\pi}{\omega}} \int_a^{a+b} \frac{E_0^2 \sin^2(\omega t + kx)}{\frac{2\pi}{\omega}(a+b-a)} dx\, dt$$

$$= \frac{K\omega E_0^2}{2\pi b} \int_0^{\frac{2\pi}{\omega}} \int_a^{a+b} \left[\frac{1}{2} - \frac{\cos(2\omega t + 2kx)}{2}\right] dx\, dt$$

$$= \frac{K\omega E_0^2}{4\pi b} \left\{ \int_0^{\frac{2\pi}{\omega}} \left[ x \Big|_a^{a+b} dt - \frac{1}{2k}\int_0^{\frac{2\pi}{\omega}} \sin[2\omega t + 2k(a+b)] dt \right. \right.$$

$$\left. \left. + \tfrac{1}{2k} \int_0^{\frac{2\pi}{\omega}} \sin(2\omega t + 2ka) dt \right\} \qquad (9)$$

Continuing $$F_1 = \frac{K\omega E_0^2}{4\pi b} \left\{ \left| bt \right|_0^{\frac{2\pi}{\omega}} + \frac{1}{4k\omega} \cos[2\omega t + 2k(a+b)] \Big|_0^{\frac{2\pi}{\omega}} \right.$$

$$\left. - \frac{1}{4k\omega} \cos(2\omega t + 2ka) \Big|_0^{\frac{2\pi}{\omega}} \right\} \qquad (10)$$

or $$F_1 = \frac{K\omega E_0^2}{4\pi b} \left\{ \frac{2\pi b}{\omega} + \frac{\cos[2k(a+b)]}{4k\omega} - \frac{\cos[2k(a+b)]}{4k\omega} \right.$$

$$\left. - \frac{\cos 2ka}{4k\omega} + \frac{\cos 2ka}{4k\omega} \right\} \qquad (11)$$

From which $$F_1 = \frac{K\omega E_0^2}{4\pi b} \cdot \frac{2\pi b}{\omega} = \frac{KE_0^2}{2} \text{ per unit length along } X. \qquad (12)$$

Since the frequency $\omega/2\pi$ and the conductive diaphragm dimensions $a$ and $b$ do not appear in Formula 12, the conclusion may be drawn that $F_1$ is independent of the microwave frequency.

If as is usually the case in guided plane wave propagation $$E = E_0 \sin \frac{\pi y}{a}$$

where $a$ is the width of the guiding plane and $a$ is ordinarily equal to or greater than $\lambda/2$, where $\lambda$ is the operating wavelength, the average force in the $y$ direction is $$F_y = \int_0^a \frac{E_0^2}{a} \sin^2 \frac{\pi y}{a} dy = \frac{E_0^2}{2a} \int_0^a \left(1 - \cos \frac{2\pi y}{a}\right) dy =$$

$$\frac{E_0^2}{2a}\left\{\left|y\right|_0^a - \frac{a}{2\pi}\left|\sin \frac{2\pi y}{a}\right|_0^a\right\} = \frac{E_0^2}{2} \quad (13)$$

Therefore, the force per unit area where E is a function of all four variables (X, Y, Z, t) in guided wave propagation is $$F_0 = \frac{KE_0^2}{4} \quad (14)$$

As stated heretofore the forces due to the electric fields of the propagated microwaves are always attracting. A similar calculation for the forces exerted between the waveguide walls due to the currents flowing in said walls indicates that such forces due to the magnetic field are approximately one-sixth as great as the forces due to the electric field. Since the sign of the forces due to the magnetic field are opposite in sign to those due to the electric field, the resultant force exerted between the opposite waveguide walls is about five-sixths of the force due to the electric field alone.

Formula 14 shows that the force $F_0$ for a constant field $E_0$ is independent of the microwave frequency. However, the field $E_0$ is not independent of frequency. In order to make the electric field $E_0$ independent of frequency and therefore to make $F_0$ completely independent of frequency, the conductive diaphragm may be employed to form a portion of the outer conductor of a concentric transmission line which is substituted for the waveguide system described heretofore. Such a concentric transmission line should be proportioned so that the inner diameter of the outer conductor of the line is very small as compared to a wavelength of the transmitted microwave energy.

As has been shown heretofore the forces and potentials developed upon two parallel electrodes of a capacitor, of which the flexible conductive diaphragm is one electrode, may be employed for measuring the magnitude of the propagated microwave energy by measuring the variation in capacitance on the variation in the charge upon said capacitance. However, the forces acting upon the flexible conductive diaphragm also may be employed to provide mechanical deformation of a piezo crystal which is maintained in contact with the flexible conductive diaphragm. For example, a piezo crystal having conductive electrodes coated thereon by electro-deposition may be set into a suitable aperture in one of the wide faces of a waveguide or coaxial transmission system whereby the conductive coating on the lower side of the crystal comprises the flexible diaphragm described heretofore. A relatively heavy electrode may be held in contact with the opposite crystal electrode by suitable spring tension or other means which effectively prevents movement of the crystal with respect to the waveguide system. Forces acting upon the crystal electrode forming a portion of the waveguide walls will provide mechanical deformation of the crystal, thus generating varying potentials between the crystal electrodes which will be characteristic of the magnitude of the propagated microwaves. If the crystal is resonated to the microwave modulation frequency, the sensitivity of the system may be greatly improved.

Formula 5 is the force acting on the lower electrode surface of the crystal. The potentials appearing across the crystal electrodes caused by the disturbing force F may be determined as follows. For a parallel plate capacitor separated by dielectric material of dielectric constant K, a spacing $S_1$, and an electrode area A $$C = \frac{KA}{4\pi S_1} \text{ statfarads or} \quad (15)$$

$$C = .0884 \frac{KA}{S_1} \times 10^{-6} \mu f \quad (16)$$

and When, for example, $K=1$, $A=1$ cm.$^2$, $S=1$ cm. and $V=1$ volt (corresponding to an energy level in a standard $x$-band waveguide of .001 watt), from Equation 5

$$F = \frac{1}{2} \times .0884 \times 10^{-12} \times 10^7 = .442 \times 10^{-6} \text{ dynes} \quad (17)$$

Also, since $A=1$ cm.$^2$, the force per cm.$^2$ also is
$$F_1 = .442 \times 10^{-6} \text{ dynes/cm.}^2 \quad (18)$$

For piezo electric materials charges and exerted forces are related by expressions of the form
$$Q = K_1 f \quad (19)$$

For quartz, if $f$ is in dynes, $K_1 = 6.4 \times 10^{-8}$, then Q is in statcoulombs.

Assuming that the piezo-electric crystal and its upper electrode have the same dielectric area as the lower electrode, and that K for quartz is approximately equal to 5, $$C = \frac{KA}{4\pi S_1} = \frac{5}{4\pi} \text{ statfarads} \quad (20)$$

where $K=5$, $A=1$ cm.$^2$ and $S_1=1$ cm.

For quartz from Formulas 18 and 19
$$Q = 6.4 \times 10^{-8} \times .442 \times 10^{-6} =$$
$$2.83 \times 10^{-14} \text{ statcoulombs} \quad (21)$$

It is now necessary to find the potential appearing across a condenser of capacity C and charge Q.

In a condenser, C, I, E, and $t$ are related by the expression $$I = C\frac{dE}{dt} \quad (22)$$

Integrating
$$E = 1/C \int I dt \quad (23)$$

and since $I = dQ/dt$ \quad (24)

$$E = 1/C \int \frac{dQ}{dt} dt = \frac{Q}{C} \quad (25)$$

Therefore, from Equations 25, 21, 20 the potential appearing across the condenser is $$E = Q/C = \frac{2.83 \times 10^{-14} \times 4\pi}{5} =$$

$$7.1 \times 10^{-14} \text{ statvolts} \quad (26)$$

or $$E = 7.1 \times 300 \times 10^{-4} = .213 \times 10^{-10} \text{ volts} \quad (27)$$

For more active piezo electric materials such as Rochelle salt, the potential appearing across the condenser is increased about 1000 times so that $E = .213 \times 10^{-7}$ volts. In either case the potential developed across the crystal electrodes is quite small and must be measured from a carefully fixed zero value. An improvement results in the measurement technique if the piezo electric device is subjected to pulses of microwave energy at a pulse rate at which the crystal is resonant. It is then necessary only to measure the zero-to-maximum values during recurring pulse cycles. An additional improvement thus results from the relatively high Q of the resonant crystal. This improvement should be of the order of, or greater than, 1000 times. The resonated quartz crystal electrode potential then becomes $E = .213 \times 10^{-7}$ volts, and the resonated Rochelle salt electrode potential becomes $$E = .213 \times 10^{-4} = 21.3$$

microvolts.

Additional improvement of the output voltage from the crystal electrodes may result from increasing the crystal thickness. All of the values enumerated heretofore are computed on the basis of a crystal having a thickness of 1 cm. Suitable coupling circuits for connecting to the crystal or variable capacitor microwave detectors will be described in detail hereinafter.

Referring to Figure 3, a rectangular waveguide 7 has a portion of its upper wide face 5 cut away to receive a quartz crystal 9 having a lower electrode 11 and an upper electrode 13 plated or otherwise deposited thereon. The lower electrode 11 is closely fitted into the aperture in the upper waveguide face 5 to prevent appreciable microwave leakage. The crystal and adjacent portion of the waveguide are enclosed within a housing 15 which includes an upper insulated terminal 17 having a spring contact 19 which presses a relatively heavy electrode 21 against the upper crystal electrode 13 to prevent appreciable displacement of the crystal when its lower electrode 11 is subjected to mechanical stresses in response to the microwave fields within the waveguide.

A microwave generator 23 may be coupled into the microwave transmission system in any manner known in the art, and the generator may be keyed or otherwise pulsed or modulated, for example, by means of a keying circuit 25 connected thereto. The potentials generated between the crystal electrodes 11 and 13, due to mechanical deformation of the crystal in response to the modulated microwave field within the waveguide are applied to the control electrode of a first amplifier tube 27, which preferably includes a grid bias battery 29 and a grid resistor 31 which are serially connected between the control grid and the cathode of the tube. Screen and anode potentials for the tube are supplied from a source of anode potential not shown. Signals derived from the anode-cathode circuit of the tube are coupled through an amplifier 33 to an indicator 35 which indicates the magnitude of the voltages generated by the crystal in response to pulses of microwave energy propagated through the waveguide.

In order that the microwave energy may be pulsed at a frequency at which the crystal is resonant, and therefore at which it is most highly efficient, the output of the amplifier 33 is coupled through a limiter circuit 37 which actuates the pulse keying circuit 25. The purpose of the limiter circuit is to actuate the pulse keying circuit uniformly irrespective of the magnitude of the voltages derived from the crystal 9. The characteristics of the circuit of the amplifier tube 27 will be explained in greater detail hereinafter by reference to the circuit of Figure 6. The indications provided by the indicator 35 will be a measure of the power or voltage of the microwave energy propagated through the waveguide 7 depending upon its termination. The measuring circuit is extremely efficient since the crystal 9 draws very little power from the modulated microwaves due to the high Q of the crystal device and because the inner crystal face is covered by a high conductivity surface. The sensitivity of the device has been discussed in detail heretofore.

The circuit and structure of Figure 4 are similar in all respects to that described heretofore with respect to Figure 3 with the exceptions that the waveguide 7 is terminated by means of a wide-band matched terminating plug 39 tapered to minimize wave reflections. The microwave signals derived from the microwave generator are pulsed by any conventional type of rotary mechanical shutter, or, as illustrated, by an electrical discharge microwave shutter 41 interposed in an opening in the upper wall of the waveguide 7 adjacent to the lower electrode 11 of the crystal 9. The shutter thickness should be as small as practicable with convenient design so that the crystal electrode 11 is close to the waveguide. The shutter 41 may, by means of a switch 43, be selectively actuated by keying signals from the keying circuit 25 or by signals derived from an external keying source connected to input terminals 45. The microwave shutter 41 also may be manually operated if predetermined irregular bursts of microwave energy are desired for the measuring circuit. Any of the foregoing shutter arrangements provide selective keying of the energization of the crystal while substantially unaffecting wave transmission to the load. An electromechanical shutter mechanism is described hereinafter by reference to Figure 7, and an ionic or sparking type of electrical shutter is described hereinafter by reference to Figure 8, both of which are serially interposed in the waveguide intermediate the microwave source and the crystal and load.

Figure 5 shows the simplest type of coupling circuit for connecting the tube 27 to the crystal device 9. The crystal electrodes 11 and 13 are connected, respectively, to the cathode and to the control electrode of the coupling tube 27. An anode resistor 47 is connected between the anode and screen electrodes of the tube, and the screen electrode is connected to the source of anode potential. The anode is coupled to any desired output amplifier or measuring circuit through a coupling capacitor 49 of suitable size to provide the desired time constant. In this circuit the noise signal potential $e_3$ is $$e_3 = \sqrt{2 \epsilon I_g R_g^2 \Delta f} \qquad (28)$$

wherein $I_g$ is the grid current, $R_g$ is the grid cathode resistance, and $\Delta f$ is the band-width in cycles per second, and $\epsilon$ is the charge on an electron. Substituting values for $I_g$ of $10^{-6}$ amperes, for $R_g$ of $10^7$ ohms, and for $\Delta f$ of 100 cycles, it is seen that the noise signal potential $e_3 = 56.5$ microvolts.

A much more efficient crystal coupling circuit having much better signal-to-noise ratio is shown in Figure 6 which is similar to the circuit of Figure 5 with the exception that a grid battery 29 and grid resistor 31 are serially connected across the crystal electrodes 11 and 13. The noise potential $e_4$ derived from this circuit is $$e_4 = \sqrt{4kTR\Delta f} \qquad (29)$$

wherein T is the temperature, $k$ is a constant and R is the grid shunt resistance.

The ratio of the noise potentials derived from the circuits of Figures 5 and 6 is $$\frac{e_3}{e_4} = \sqrt{\frac{2eI_rR_s^2\Delta f}{4kTR\Delta f}} \simeq \frac{20I_rR_s^2}{R} \quad (30)$$

so that at approximately room temperature, and selecting a value of R for the grid resistor 31 equal to $R_g$, the grid cathode resistance, or $10^7$ ohms $$\frac{e_3}{e_4} \simeq 10\sqrt{2} \quad (31)$$

However, if R is equal to $R_g/10$ which is approximately equal to the resonant resistance of the crystal $$\frac{e_3}{e_4} \simeq 45 \quad (32)$$

thereby indicating that the circuit configuration of Figure 6 is preferable to that of Figure 5.

Figure 7 shows an electromechanical means for pulsing continuous microwave signals derived from the generator 23 and propagated through the waveguide 7. An aperture device 51 interposed in the waveguide 7 intermediate the waveguide 23 and the crystal 9 cooperates with a transversely movable shutter 53 which is coupled through a linkage or lever mechanism 55 to, for example, the moving coil structure 57 of a dynamic motor mechanism 59. The field structure 61 of the motor mechanism 59 includes a field winding 63 which is connected to a source of field current such, for example, as a battery 65. The moving coil 57 is actuated by current pulses derived from the pulse keying circuit 25 which is responsive to the output of the limiter 37 as described heretofore. Pulses derived from the keying circuit thereby actuate the moving coil 57, and the motion thereof is transmitted through the lever mechanism 55 to move the shutter 53 in a transverse direction across the aperture device 51 for interrupting the propagation along the waveguide of the continuous microwaves.

Figure 8 shows means whereby the continuous microwaves derived from the generator 23 may be interrupted by an ionic discharge across a spark gap device 67 forming an aperture in the waveguide 7 intermediate the generator and the crystal. The spark gap device 67 may be a resonant or non-resonant aperture, of any type known in the microwave art, which is actuated by pulses derived by the pulse keying circuit 25. Pulses derived from the keying circuit thus generate a spark discharge across the spark gap of the device 67. The spark discharge effectively short-circuits the waveguide 7, thus preventing microwave propagation along the guide to the crystal and load for the duration of the spark discharge.

Figures 9 and 10 show the structure of a typical variable capacitor device, one electrode 69 of which is a flexible conductive screen covering the aperture in the wide upper wall 5 of the rectangular waveguide 7. The conductive screen may comprise, for example, a copper membrane having a mesh of 1000 conductors per linear inch and a thickness of the order of 1 mil or less. It may be produced by photo-deposition or other known means and suitably clamped in a supporting bezel. A typical method of making such a fine screen is disclosed in the copending U. S. application of Harold B. Law, Serial No. 531,008, filed April 14, 1944, now abandoned. An insulating block 71 mounted on the upper waveguide wall 5 supports a second capacitor electrode 73 in a position which is parallel to and closely adjacent to the flexible conductive diaphragm 69. Thus deformation of the diaphragm 69 in response to the microwave fields of the microwave energy propagated through the waveguide 7 varies the effective capacitance C between the capacitor electrodes 69 and 73.

The circuit of Figure 11 shows the means in which the variable capacitance C provided by the electrodes 69 and 73 may be coupled to an indicator circuit, not shown, to indicate the variation in the electrical charge upon said capacitor in response to variations in the capacitance thereof. The variable capacitor C is charged by means of a circuit including a charging battery 75 and a series charging resistor 77. The potential upon the charged capacitor C is coupled through a grid coupling capacitor 79 to the control electrode of an input coupling tube 81. A grid bias battery 83 serially-connected with a grid resistor 85 is connected across the control grid-cathode circuit of the tube. The anode and screen circuits of the tube 81 are similar to those described heretofore with respect to the circuits of Figures 5 and 6. Since there is a constant charging voltage circuit for capacitor C through the resistor 77, and since the time constant of the elements 77 and C is long at the modulation frequency, the charge on C remains constant during the modulation cycle, so that the variation in capacitance due to the microwave fields within the waveguide provides a varying potential upon the charged capacitor C which is applied to the control grid circuit of the tube 81. This potential varies at the microwave keying frequency and may be employed to control an amplifier and indicator circuit in the same manner as described heretofore.

The variable capacitance provided by the flexible conductive screen 69 of the device of Figures 9 and 10 also may be employed to modulate the frequency of an oscillator circuit whereby the oscillator frequency shift due to the variations in capacitance are a measure of the characteristics of the microwaves propagated through the waveguide 7.

Figure 12 shows the capacitance as the tuning element of a tank circuit which includes a tapped inductor 87 connected in a conventional Hartley oscillator circuit including a triode tube 89. The anode circuit of the oscillator tube 89 is connected through a coupling capacitor 91 to a frequency discriminator 93 which provides a current or voltage proportional to the oscillator frequency shift due to the capacitance variations. The output of the discriminator 93 is coupled through an amplifier 33 to an indicator 35 in the same manner as described heretofore.

Figure 13 shows a coaxial line type of oscillator tank circuit for a Hartley oscillator wherein the capacitive electrode 73 is closely coupled to the flexible conductive screen 69 which covers the aperture in the upper wall 5 of the waveguide 7. The capacitive electrode 73 terminates one end of the center conductor 95 of a coaxial line section which includes a concentric outer conductor 97. The ends of the coaxial conductors 95, 97 remote from the capacitive electrode 73 are terminated in a threaded bushing 99 which permits longitudinal adjustment of the complementarily threaded inner line conductor 95 to adjust the spacing of the capacitive electrodes 69 and 73. Coupling from the anode of the oscillator tube 89 to the center conductor 95 of the coaxial tank circuit is accomplished by means of a conductor 101 passing through an insulated bushing 103 disposed intermediate the line conductors 95 and 97 a short distance from the capacitive electrode 73.

An anode coupling capacitor 105 is connected in series with the conductor 101 to isolate anode voltage from the tank circuit. The grid of the oscillator tube 89 is connected directly to the outer conductor 97 of the tank circuit. The cathode of the oscillator tube 89 is connected through a series circuit, comprising an inductor 107 and a parallel-connected cathode resistor 109 and bypass capacitor 111, to the outer tank circuit conductor 97. Output signals are derived by means of a coupling loop 113 coupled to the cathode inductor 107 and connected through an output coaxial line 115 to the output circuit. The output signal potential will be of the order of one-tenth of the oscillator voltage developed across the tank circuit.

The circuit configuration of Figure 13 has the disadvantage that the output potential must be rather low in order to prevent excessive shunt or parallel loading of the oscillator circuit to provide efficient control thereof by the small variable capacitor comprising the electrodes 69 and 73. The circuit of Figure 14 shows an improved output coupling circuit having extremely high shunt resistance which permits the anode of the oscillator tube 89 to be coupled to the control electrode of an amplifier tube 117 which may be either a triode or a pentode, and which is connected as a cathode follower. The anode of the oscillator tube 89 is coupled through a coupling capacitor 119 to the control grid of the cathode follower 117. An extremely high value grid resistor 121 is connected from the control grid of the cathode follower 117 to an intermediate point on a series cathode resistor 123 which is serially-connected through a coaxial line inductor 125 to ground. An intermediate point 127 on the inner conductor of the cathode coaxial line inductor 125 is coupled through an output coaxial line 129 to any desired low impedance output circuit.

The advantage of the cathode follower circuit thus described is that its effective input resistance may be made of the order of several thousand megohms by proper selection of grid and cathode circuit parameters, while the output circuit may be of relatively low impedance. Satisfactory output signal level is thus provided with maximum useful signal-to-noise signal voltage ratio. If desired the same type of cathode follower circuit may be substituted for the circuits of Figures 5 and 6 for directly coupling the amplifier and indicator circuits to the crystal devices described heretofore.

Figures 15 and 16 show the application of the variable capacitive features of the invention to coaxial line technique which provides a substantially frequency independent embodiment of the invention. A portion of the outer conductor 131 of a coaxial line 133, having an inner conductor 135, is removed to permit the insertion of the flexible conductive diaphragm or screen 137. A bracket 139, to which an insulating block 141 is mounted, supports a fixed conductive electrode 143 in close proximity to the flexible conductive diaphragm 137. This device may be coupled to measuring circuits which permit measurements of either the electrical potential, or the frequency shift in an oscillator circuit, due to the capacitive variations resulting from deformation of the flexible diaphragm 137 in response to the pulsed microwave field in the coaxial line. As explained heretofore, in order that the coaxial line embodiment of the invention may be substantially frequency independent, the radius of the inner surface 145 of the outer conductor 131 of the coaxial line must be a small portion of a wavelength at the operating microwave frequency.

Thus the invention disclosed comprises several embodiments and modifications thereof of improved methods and systems for measuring the characteristics of guided microwave energy by employing the mechanical deformation of a flexible conductive element, forming a portion of the microwave guiding means, in response to the fields of said microwaves. The displacement of the flexible conductive elements is employed for generating potentials by means of a piezo crystal having said element for one of its electrodes, or by means of a variable capacitor of which the element comprises one electrode. Also several coupling circuits are disclosed for providing efficient electrical coupling to the field responsive devices.

I claim as my invention:

1. Apparatus for measuring microwaves propagated through a waveguide transmission system including a conductive diaphragm forming a portion of the transverse wall of said waveguide, said diaphragm being subjected to variable mechanical displacement due substantially only to the varying electrical field of said microwaves, a fixed conductive electrode disposed adjacent said diaphragm and forming a variable impedance therewith, and means responsive to said variable impedance for indicating the magnitude of said propagated microwaves.

2. Apparatus for measuring microwaves propagated through a waveguide transmission system including a conductive diaphragm forming a portion of the transverse wall of said waveguide, said diaphragm being subjected to variable mechanical displacement due substantially only to the varying electrical field of said microwaves, a fixed conductive electrode disposed adjacent said diaphragm and forming a variable impedance therewith, a generator having its frequency controlled by said variable impedance, means for measuring said frequency and means for indicating the magnitude of said propagated microwaves as a function of said measured frequency.

3. Apparatus for measuring microwaves propagated through a waveguide transmission system including a conductive diaphragm forming a portion of the transverse wall of said waveguide, said diaphragm being subjected to variable mechanical displacement due substantially only to the varying electrical field of said microwaves, a fixed conductive electrode disposed adjacent said diaphragm and forming a variable impedance therewith, substantially constant potential means charging said variable impedance, means for detecting the variations in the charges on said impedance, and means for indicating the magnitude of said propagated microwaves as a function of said charge variations.

4. Apparatus for measuring modulated microwaves propagated through a waveguide transmission system including a conductive diaphragm forming a portion of the transverse wall of said waveguide, said diaphragm being subjected to variable mechanical displacement due substantially only to the varying electrical field of said microwaves, a fixed conductive electrode disposed adjacent said diaphragm and forming a variable impedance therewith, means for deriving signals in response to said impedance variations, a feedback circuit responsive to said signals for controlling the modulation of said microwaves, and means responsive to said signals for indicating the magnitude of said microwaves.

5. Apparatus for measuring modulated microwaves propagated through a waveguide transmission system including a conductive diaphragm forming a portion of the transverse wall of said waveguide, said diaphragm being subjected to variable mechanical displacement due substantially only to the varying electrical field of said microwaves, a fixed conductive electrode disposed adjacent said diaphragm and forming a variable impedance therewith, means for deriving signals in response to said impedance variations, means disposed in said waveguide system for keying said microwaves, a feedback circuit responsive to said signals for controlling aid microwave keying means, and means responsive to said signals for indicating the magnitude of said microwaves.

LOWELL E. NORTON.